United States Patent
Adamczyk et al.

(10) Patent No.: US 8,691,904 B2
(45) Date of Patent: *Apr. 8, 2014

(54) THIOBIS PHENOLIC ANTIOXIDANT/POLYETHYLENE GLYCOL BLENDS

(75) Inventors: Antoni Adamczyk, Piscataway, NJ (US); Daniel Emley, Manchester, NJ (US); Neil W. Dunchus, Kinnelon, NJ (US); Jeffrey M. Cogen, Flemington, NJ (US); Susan Song, High Bridge, NJ (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/699,952

(22) PCT Filed: Jun. 8, 2011

(86) PCT No.: PCT/US2011/039546
§ 371 (c)(1), (2), (4) Date: Nov. 26, 2012

(87) PCT Pub. No.: WO2011/156442
PCT Pub. Date: Dec. 15, 2011

(65) Prior Publication Data
US 2013/0068498 A1    Mar. 21, 2013

Related U.S. Application Data (60) Provisional application No. 61/353,286, filed on Jun. 10, 2010, provisional application No. 61/488,375, filed on May 20, 2011.

(51) Int. Cl.
C08K 5/13    (2006.01)
C08K 5/00    (2006.01)
C08F 210/00    (2006.01)
C08F 110/02    (2006.01)

(52) U.S. Cl.
USPC ............ 524/333; 106/503; 526/352; 526/348

(58) Field of Classification Search
USPC ................. 524/333; 106/503; 526/352, 348
See application file for complete search history.

(56) References Cited

U.S. PATENT DOCUMENTS

| | | |
|---|---|---|
| 331,809 A | 12/1885 | Motherwell |
| 3,334,081 A | 8/1967 | Madgwick et al. |
| 3,362,932 A | 1/1968 | Mauz |
| 4,088,622 A | 5/1978 | Pearl |
| 4,101,445 A | 7/1978 | Levine et al. |
| 4,302,565 A | 11/1981 | Goeke et al. |
| 4,305,849 A | 12/1981 | Kawasaki et al. |
| 4,440,671 A | 4/1984 | Turbett |
| 4,508,842 A | 4/1985 | Beran et al. |
| 4,857,600 A | 8/1989 | Gross et al. |
| 4,937,299 A | 6/1990 | Ewen et al. |
| 5,246,783 A | 9/1993 | Spenadel et al. |
| 5,317,036 A | 5/1994 | Brady, III et al. |
| 5,332,793 A | 7/1994 | Cann |
| 5,342,907 A | 8/1994 | Cann et al. |
| 5,371,145 A | 12/1994 | Daniell et al. |
| 5,405,901 A | 4/1995 | Daniell et al. |
| 5,410,003 A | 4/1995 | Bai |
| 6,180,706 B1 | 1/2001 | Keogh |
| 6,496,629 B2 | 12/2002 | Ma et al. |
| 6,714,707 B2 | 3/2004 | Rossi et al. |
| 6,869,955 B2 | 3/2005 | Wilde |
| 6,869,995 B2 | 3/2005 | Caronia et al. |
| 8,455,580 B2 * | 6/2013 | Sengupta et al. ............. 524/236 |
| 2005/0148715 A1 | 7/2005 | Caronia et al. |
| 2009/0264567 A1 | 10/2009 | Prins et al. |

FOREIGN PATENT DOCUMENTS

| | | |
|---|---|---|
| EP | 1571175 | 9/2005 |
| EP | 1731564 | 12/2006 |
| JP | 2001-19811 | * 1/2007 |
| WO | 2006/131266 A1 | 12/2006 |
| WO | 2007097511 | 8/2007 |

OTHER PUBLICATIONS

International Preliminary Report on Patentability for PCT App. No. PCT/US2011/039546 mailed Sep. 6, 2012.
International Search Report for PCT App. No. PCT/US2011/039546 mailed Aug. 12, 2011.

* cited by examiner

*Primary Examiner* — William Cheung
(74) *Attorney, Agent, or Firm* — Whyte Hirschboeck Dudek S.C.

(57) ABSTRACT

Thiobis phenolic antioxidants are efficiently dry or melt blended with a tree-resistant, crosslinkable polyethylene by first forming a blend, preferably a dry blend, of the antioxidant with a polyalkylene glycol (PAG), and then mixing the blend with the polyethylene. The incorporation of thiobis phenolic antioxidant and PAG blend into polyethylene provides the PE with high oxidative induction time (OIT) which is a measure of the oxidative stability of the PE.

15 Claims, 2 Drawing Sheets

FIG. 1

FIG. 2
--- TBM6/PEG20000 (0.02:1) — TBM6/PEG20000 (1:1)
— TBM6/PEG20000 (2:1) -·- TBM6/PEG20000 (3:1)

FIG. 3
♦ PEG20000
■ TBM6/PEG20000 (0.6:1)

THIOBIS PHENOLIC ANTIOXIDANT/POLYETHYLENE GLYCOL BLENDS

CROSS REFERENCE TO RELATED APPLICATIONS

The present application is the national phase of PCT Patent Application No. PCT/US2011/039546 filed Jun. 8, 2011, which claims the benefit of U.S. Ser. No. 61/353,286, filed Jun. 10, 2010 and U.S. Ser. No. 61/488,375, filed May 20, 2011. The entire content of which is incorporated by reference herein.

BACKGROUND OF THE INVENTION

1. Field of the Invention

This invention relates to wire and cable. In one aspect the invention relates to tree-resistant, crosslinkable polyethylene compositions while in another aspect, the invention relates to insulation sheaths and other cable coverings comprising such compositions. In still another aspect the invention relates to such compositions and cable coverings comprising a thiobis phenolic antioxidant while in yet another aspect, the invention relates to a process for mixing the thiobis phenolic antioxidant with the polyethylene.

2. Description of the Related Art

U.S. Pat. No. 6,869,995 describes a composition comprising polyethylene (PE), a thiobis phenolic antioxidant and a polyethylene glycol (PEG) with a molecular weight in the range of 1000 to 100,000. This composition is useful for the manufacture of electric power cable insulation sheathing with good scorch resistance during manufacture and good water-tree resistance during use. The PE is compounded with PEG in a two-roll mill operating at 24 revolutions per minute (rpm) on the front roll and 36 rpm on the back roll and a temperature of 125 to 130° C. on the two rolls for 10 minutes. In one embodiment, the procedure involves preheating the resin to 70° C. in an oven; fluxing the resin as quickly as possible on the two-roll mill (3 to 4 minutes); adding PEG and 4,4'-thiobis-(2-tert-butyl-5-methyl-phenol) (TBM6) and fluxing for an additional 3 to 4 minutes; and then adding peroxide and fluxing, peeling, and folding until well mixed. The patent does not discuss the use of a pre-formed blend of TBM6 and PEG.

TBM6 is a high performance thiobis phenolic antioxidant and scorch retardant used in crosslinkable (XL) PE compositions, and it has a high melting temperature of 162° C. The high melting point of this additive causes several problems in the production of insulation compounds for wire and cable applications. These problems include:

(A) TBM6 is not highly soluble in polyethylene resins which can result in unmelted TBM6 particles in the polyethylene insulation compositions. These unmelted particles of TBM6 are undesirable in XLPE because they can cause unacceptable electrical properties in finished cables produced from the material.

(B) The high melting point of TBM6 creates difficulty for using this additive in liquid additive feeder systems at the compounding facility and thus makes the accurate metering of the additive into the compound difficult. For those compounding facilities that employ only liquid additive feeding systems, TBM6 is simply not an option for use in the compound formulation.

(C) The high melting point of TBM6 creates difficulty in filtering the additive at the compounding facility to improve the additive cleanliness. Cleanliness is an important feature of XLPE insulation compositions due to the likelihood for impurities and defects to cause electrical failures in finished cables produced from XLPE. Improved TBM6 additive cleanliness translates to improved finished XLPE insulation compound cleanliness.

(D) The powder form of TBM6 is considered an explosive dust. This necessitates the use of costly explosion-proof materials handling equipment in order to use the powder form of TBM6. Otherwise, the more costly compacted pellet form of TBM6 must be used to minimize dust accumulation (TBM6 has a low minimum ignition energy (MIE) and a high dust deflagration index (Kst)).

PEG 20000, which is used as a tree retardant additive in crosslinkable polyethylene (XLPE) insulation compositions for wire and cable applications (U.S. Pat. Nos. 4,305,849, 4,440,671, and 6,869,955), has a melting point of about 62° C.

SUMMARY OF THE INVENTION

In one embodiment the invention is a mixture of at least one thiobis phenolic antioxidant and at least one polyalkylene glycol (PAG) of a weight average molecular weight of at least 1,000. In one embodiment the thiobis phenolic antioxidant and PAG are present at a thiobis phenolic antioxidant to PAG weight ratio from 0.02:1 to 3:1.

In one embodiment the invention is a method of mixing a solid thiobis phenolic antioxidant with polyethylene, the method comprising the steps of (A) mixing the thiobis phenolic antioxidant with PAG to form a blend, and (B) mixing the blend with polyethylene. In one embodiment the thiobis phenolic antioxidant and PAG are dissolved in a common solvent to form the blend, and then the solvent is removed before mixing the blend with polyethylene. In one embodiment the thiobis phenolic antioxidant and PAG are melt mixed to form the blend before mixing the blend with polyethylene. In one embodiment the thiobis phenolic antioxidant and PAG are dry blended prior to mixing with the polyethylene. The thiobis phenolic antioxidant and PAG need not, but preferably form a homogeneous blend.

The thiobis phenolic antioxidant/PAG blend has an unexpectedly low major melt point and some minor fraction melt points. For example, a 0.6:1 weight ratio of TBM6 and PEG 20000 blend has a low major melt point of 59° C. and a minor fraction melt point of 81° C. Moreover, the thiobis phenolic antioxidant/PAG blend has a markedly lower viscosity than neat PAG at temperatures above 120° C. For example, a 0.6:1 weight ratio of TBM6 and PEG 20000 blend has a lower viscosity than neat PEG 20000 at temperatures above 120° C.

The incorporation of the thiobis phenolic antioxidant and PAG blend into polyethylene (PE) provides the PE with surprisingly high oxidative induction time (OIT) which is a measure of the oxidative stability of the PE. This OIT is substantially higher than that obtained with a similar PE in which TBM6 and PAG, e.g., PEG 20000, are added separately, e.g., not as a pre-formed blend.

These unexpected features of the blended mixture of thiobis phenolic antioxidant and PAG provide solutions to the problems described above.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the molecular weight of PEG and the weight ratio of thiobis phenolic antioxidant to PEG.

"Wire" and like terms mean a single strand of conductive metal, e.g., copper or aluminum, or a single strand of optical fiber.

"Cable," "power cable," and like terms mean at least one wire or optical fiber within a protective jacket or sheath. Typically, a cable is two or more wires or optical fibers bound together, typically in a common protective jacket or sheath. The individual wires or fibers inside the jacket may be bare, covered or insulated. Combination cables may contain both electrical wires and optical fibers. The cable, etc., can be designed for low, medium and high voltage applications. Typical cable designs are illustrated in U.S. Pat. Nos. 5,246,783, 6,496,629 and 6,714,707.

"Composition" and like terms mean a mixture or blend of two or more components.

"Blend", "mixture" and like terms mean a thiobis phenolic antioxidant and PAG combined with one another to form a composition. The thiobis phenolic antioxidant and PAG can be combined in any manner, e.g., melted, dissolved together in a common solvent, dry blended, etc.

"Antioxidant" and like terms mean chemical compounds that minimize the oxidation that occurs during the processing of polymers.

"Crosslinked", "cured" and similar terms mean that the polymer, before or after it is shaped into an article, was subjected or exposed to a treatment which induced crosslinking and has xylene or decalene extractables between 40 and 100 weight percent (i.e., greater than or equal to 40 weight percent gel content).

"Crosslinkable", "curable" and like terms means that the polymer, before or after shaped into an article, is not cured or crosslinked and has not been subjected or exposed to treatment that has induced substantial crosslinking although the polymer comprises additive(s) or functionality which will cause, promote or enable substantial crosslinking upon subjection or exposure to such treatment (e.g., exposure to water, heat, or irradiation).

Thiobis Phenolic Antioxidant

Any thiobis phenolic antioxidant that provides protection against oxidation for polyethylene as it is processed at elevated temperatures, e.g., as in the manufacture of a wire and cable covering, can be used in the practice of this invention. Representative examples of thiobis phenolic antioxidants include, but are not limited to, 4,4'-thiobis(2-tert-butyl-5-methylphenol) (also known as TBM-6, CAS 96-69-5); 2,2'-thiobis(6-t-butyl-4-methylphenol); 4,4'-thiobis(2-methyl-6-t-butylphenol); 2,2'-thiobis(4-octylphenol) (CAS 16857-10-6); 2,2'-thiobis(6-t-butyl-p-cresol) (also known as TBP-6, CAS 90-66-4) and mixtures of two or more such antioxidants. In one embodiment, 4,4'-thiobis(2-tert-butyl-5-methylphenol) is a preferred thiobis phenolic antioxidant.

PAG

The polyalkylene glycols used in the practice of this invention are known compounds, and they are made by the polymerization of an alkylene oxide monomer or a mixture of alkylene oxide monomers initiated by one or more of water and a mono-, di- or polyhydric compound, and promoted by a base catalyst under reactive conditions known in the art (see, for example, "Alkylene Oxides and Their Polymers", Surfactant Science Series, Vol 35). Upon the completion of the polymerization, the reaction mixture is vented and then neutralized by the addition of one or more acids. Optionally, the salts resulting from the neutralization can be removed by any known means. The neutralized polyalkylene glycol product has a pH value of 4.0 to 8.5. For purposes of this invention, "polyalkylene glycol" includes dialkylene glycol, and specifically diethylene glycol.

In one embodiment the initiator is ethylene or propylene glycol or an oligomer of one of them. In one embodiment, the initiator is a compound of the formula $$R^1O-(CHR^2CH_2O)_m-R^3$$

in which $R^1$ and $R^3$ are independently a $C_1$ to $C_{20}$ aliphatic or aromatic group with linear or branched structure and which may contain one or more unsaturated bonds, or hydrogen, with the proviso that at least one of R' and $R^3$ is hydrogen; each $R^2$ is independently hydrogen, methyl, or ethyl; and m is an integer of 0 to 20. In one embodiment the starter compound is a hydrocarbon compound containing 3 or more hydroxyl groups, such as glycerol or sorbitol.

In one embodiment, the catalyst is a base, typically at least one of an alkali or alkaline earth metal hydroxide or carbonate, aliphatic amine, aromatic amine, or a heterocyclic amine. In one embodiment, sodium or potassium hydroxide is the base catalyst.

The alkylene oxide used as the monomer in the polymerization is a $C_2$ to $C_8$ oxide, such as ethylene oxide, propylene oxide, butylene oxide, hexene oxide, or octene oxide. In one embodiment, the alkylene oxide is ethylene or propylene oxide.

In one embodiment of this invention the polyalkylene oxide is polyethylene oxide, or a water soluble copolymer of ethylene oxide (EO) and propylene oxide (PO), or a mono methyl, ethyl, propyl, or butyl ether of one of them, or a polyethylene oxide or a copolymer of EO and PO initiated by glycerol. In one embodiment, the polyalkylene glycol is polyethylene glycol that has a molecular weight from 1,000 to 100,000. Typically the minimum molecular weight is 5,000, more typically 10,000 and even more typically 15,000. The typical maximum molecular weight is 100,000, more typically 75,000 and even more typically 50,000. Though the polyethylene glycol is preferred, other polyalkylene glycols or mixtures of polyalkylene glycols may be used instead, including polypropylene glycol and polyethylene-polypropylene glycol.

Thiobis Phenolic Antioxidant/PAG Blend

The thiobis phenolic antioxidant and PAG are typically present at a thiobis phenolic antioxidant to PAG weight ratio from 0.02:1 to 3:1, more typically from 0.1:1 to 2:1 and even more typically from 0.5:1 to 1:1. The thiobis phenolic antioxidant and PAG can be blended in any suitable manner, e.g., melt blending, dissolution in a common solvent with subsequent removal of the solvent, dry blending; etc. While the practice of this invention does not require a homogeneous blend, preferably the thiobis phenolic antioxidant and PAG are mixed with one another until at least a near, preferably a fully, homogeneous mixture is obtained. In the solvent blending embodiment, solvents include, but are not limited to, halogenated hydrocarbons, e.g., dichloromethane, carbon tetrachloride, o-dichlorobenzene, etc., and the solvent is removed by any suitable means, e.g., evaporation. The thiobis phenolic antioxidant and PAG can be dissolved in the common solvent either individually and in any order and then blended with one another, or simultaneously. The blend can be used in melted or solid form.

In a preferred embodiment the thiobis phenolic antioxidant and PAG are dry blended with one another, i.e., both the antioxidant and PAG are solid at the time of blending. The manner and equipment used to effect the dry blending can vary to convenience, e.g., high, low, and medium intensity dry solid blenders, mortar and pestle, etc. The antioxidant and PEG are preferably in powder form, typically of a particle size of 1 to 1,000 micrometers for the thiobis phenolic antioxidant and 1 to 10,000 micrometers for the PEG.

Optionally and preferably, the blend of thiobis phenolic antioxidant and PAG is compacted to any shape, e.g., pellet, tablet, flake, etc., prior to mixing with the PE. This physical blend, preferably but not necessarily compacted, can be accurately metered to the PE compounding equipment using traditional solid feeding systems to simplify raw material handling. This physical blend provides reduced melting point of the thiobis phenolic antioxidant and thus easier melt mixing into the PE compound thus improving the dispersion of the antioxidant in the composition and eliminating unmelted antioxidant in the PE. Moreover, a stable compacted physical blend of thiobis phenolic antioxidant and PAG eliminates the explosiveness issues related to the powder form of thiobis phenolic antioxidants. This, in turn, reduces capital expenditures for explosion-proof materials handling equipment, simplifies raw material handling, and simplifies housekeeping at a manufacturing facility. Yet another advantage of the physical blend over individual addition of the antioxidant and PAG is the preservation of the low sweat-out and improved scorch features provided by the antioxidant and the improved resistance to water trees provided by the PEG. Still another advantage is that filtration of the blend, once converted to the liquid state, is facilitated, and this is important in production of clean insulation compositions.

One preferred dry blend is TBM6 and PEG 20,000. TBM6 has a melting point of 162° C., while PEG 20,000 has a melting point of about 62° C. The physical blend of TBM6 and PEG 20,000 at a ratio of 0.6:1 TBM6 to PEG 20,000 has an unexpectedly low melt point, with almost all of the mixture melting at 63° C. (and some very minor fraction melt points at 130° C. and 161° C. representing an insignificant percentage of the composition).

The amount of blend mixed with the PE is typically at least 0.1, more typically at least 0.5 and even more typically at least 0.9, weight percent (wt %) based on the weight of the PE composition (including the PE resin, antioxidant/PAG blend, and any additives and fillers). The maximum amount of blend in the PE composition typically does not exceed 3, more typically does not exceed 1.5 and even more typically does not exceed 1.1, wt %.

Polyethylene

Polyethylene, as that term is here used, is a homopolymer of ethylene or a copolymer of ethylene and a minor proportion of one or more alpha-olefins having 3 to 12 carbon atoms, and preferably 4 to 8 carbon atoms, and, optionally, a diene, or a mixture of such homopolymers and copolymers. The mixture can be a mechanical blend or an in situ blend. Examples of the alpha-olefins are propylene, 1-butene, 1-hexene, 4-methyl-1-pentene, and 1-octene.

The polyethylene can be homogeneous or heterogeneous. The homogeneous polyethylenes usually have a polydispersity (Mw/Mn) in the range of 1.5 to 3.5 and an essentially uniform comonomer distribution, and are characterized by single and relatively low DSC melting points. The heterogeneous polyethylenes, on the other hand, have a polydispersity (Mw/Mn) greater than 3.5 and do not have a uniform comonomer distribution. Mw is defined as weight average molecular weight and Mn is defined as number average molecular weight. The density of the polyethylenes can range from 0.860 or less to 0.950 or more gram per cubic centimeter (g/cc), but typically have a density in the range of 0.870 to 0.930 g/cc. They typically have a melt index in the range of 0.1 to 50 grams per 10 minutes (g/10 min).

The polyethylenes can be produced by low or high pressure processes. They can be produced in the gas phase or in the liquid phase in solutions or slurries by conventional techniques. Low pressure processes are typically run at pressures below 1000 psi whereas high pressure processes are typically run at pressures above 15,000 psi.

Typical catalyst systems, which can be used to prepare these polyethylenes, include the following: magnesium/titanium based catalyst systems, which are exemplified by the catalyst system described in U.S. Pat. No. 4,302,565 (heterogeneous polyethylenes); vanadium based catalyst systems such as those described in U.S. Pat. No. 4,508,842 (heterogeneous polyethylenes) and U.S. Pat. Nos. 5,332,793, 5,342,907, and 5,410,003 (homogeneous polyethylenes); a chromium based catalyst system such as that described in U.S. Pat. No. 4,101,445; a metallocene catalyst system such as that described in U.S. Pat. Nos. 4,937,299 and 5,317,036 (homogeneous polyethylenes); or other transition metal catalyst systems. Many of these catalyst systems are often referred to as Ziegler-Natta catalyst systems or Phillips catalyst systems. Catalyst systems, which use chromium or molybdenum oxides on silica-alumina supports, can be included here. Typical processes for preparing the polyethylenes are also described in the aforementioned patents. Typical in situ polyethylene blends and processes and catalyst systems are described in U.S. Pat. Nos. 5,371,145 and 5,405,901. The various polyethylenes can include low density homopolymers of ethylene made by high pressure processes (HP-LDPE), linear low density polyethylenes (LLDPE), very low density polyethylenes (VLDPE), medium density polyethylenes (MDPE), and high density polyethylene (HDPE) having a density greater than 0.940 g/cc. The latter four polyethylenes are generally made by low pressure processes. A conventional high pressure process is described in Introduction to Polymer Chemistry, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of 10,000 to 30,000 pounds per square inch (psi) and the temperature is in the range of 175 to 250° C., and in the tube reactor, the pressure is in the range of 25,000 to 45,000 psi and the temperature is in the range of 200 to 350° C.

The VLDPE can be a copolymer of ethylene and one or more alpha-olefins having 3 to 12 carbon atoms and typically 3 to 8 carbon atoms. The density of the VLDPE can be in the range of 0.870 to 0.915 g/cc. It can be produced, for example, in the presence of (a) a catalyst containing chromium and titanium, (b) a catalyst containing magnesium, titanium, a halogen, and an electron donor; or (c) a catalyst containing vanadium, an electron donor, an alkyl aluminum halide modifier, and a halocarbon promoter. Catalysts and processes for making the VLDPE are described, respectively, in U.S. Pat. Nos. 4,101,445, 4,302,565, and 4,508,842. The melt index of the VLDPE can be in the range of 0.1 to 20 g/10 min and is typically in the range of 0.3 to 5 g/10 min. The portion of the VLDPE attributed to the comonomer(s), other than ethylene, can be in the range of 1 to 49 percent by weight (wt %) based on the weight of the copolymer and is typically in the range of 15 to 40 wt %. A third comonomer can be included, e.g., another alpha-olefin or a diene such as ethylidene norbornene, butadiene, 1,4-hexadiene, or a dicyclopentadiene. Ethylene/propylene copolymers and ethylene/propylene/diene terpolymers are generally referred to as EPRs and the terpolymer is generally referred to as an EPDM. The third comonomer can be present in an amount of 1 to 15 wt % based on the weight of the copolymer and is typically present in an amount of 1 to 10 wt %. Typically the copolymer contains two or three comonomers inclusive of ethylene.

The LLDPE can include the VLDPE and MDPE, which are also linear, but, generally, has a density in the range of 0.916 to 0.925 g/cc. It can be a copolymer of ethylene and one or more alpha-olefins having 3 to 12 carbon atoms, and typically 3 to 8 carbon atoms. The melt index can be in the range of 1 to 20 g/10 min, and is typically in the range of 3 to 8 g/10 min. The alpha-olefins can be the same as those mentioned above, and the catalysts and processes are also the same subject to variations necessary to obtain the desired densities and melt indices.

As noted, included in the definition of polyethylene are homopolymers of ethylene made by a conventional high pressure process. In one embodiment of the invention, the polyethylene is a homopolymer of ethylene made by the high pressure process. The homopolymer preferably has a density in the range of 0.910 to 0.930 g/cc. The homopolymer can also have a melt index in the range of 1 to 5 g/10 min, and typically has a melt index in the range of 0.75 to 3 g/10 min. Melt index is determined under ASTM D-1238, Condition E. It is measured at 190° C. and 2160 grams.

Copolymers comprised of ethylene and unsaturated esters are well known, and can be prepared by the conventional high pressure techniques described above. The unsaturated esters can be alkyl acrylates, alkyl methacrylates, and vinyl carboxylates. The alkyl group can have 1 to 8 carbon atoms and preferably has 1 to 4 carbon atoms. The carboxylate group can have 2 to 8 carbon atoms and preferably has 2 to 5 carbon atoms. The portion of the copolymer attributed to the ester comonomer can be in the range of 5 to 50 percent by weight based on the weight of the copolymer, and is preferably in the range of 15 to 40 percent by weight. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate and vinyl butanoate. The melt index of the ethylene/unsaturated ester copolymers can be in the range of 0.5 to 50 g/10 min, and is preferably in the range of 2 to 25 g/10 min. One process for the preparation of a copolymer of ethylene and an unsaturated ester is described in U.S. Pat. No. 3,334,081. Copolymers of silanes, such as vinyltrimethoxysilane, and ethylene may also be used.

If one or more additional resins are introduced into the composition, the amount of components of thiobis phenolic antioxidant and PAG is based on 100 parts by weight of the total resins in the composition. These resins can be various polyethylenes or polypropylenes, or other polymer additives commonly used in wire and cable.

Additives

Conventional additives, which can be introduced into the polyethylene formulation, are exemplified by antioxidants, coupling agents, ultraviolet absorbers or stabilizers, antistatic agents, pigments, dyes, nucleating agents, reinforcing fillers or polymer additives, carbon black, slip agents, plasticizers, processing aids, lubricants, viscosity control agents, tackifiers, anti-blocking agents, surfactants, extender oils, metal deactivators, voltage stabilizers, flame retardant fillers and additives, crosslinking agents, boosters, and catalysts, and smoke suppressants. Fillers and additives can be added in amounts ranging from less than about 0.1 to more than about 200 parts by weight for each 100 parts by weight of the base resin, in this case, polyethylene.

Examples of antioxidants are: hindered phenols such as tetrakis[methylene(3,5-di-tert-butyl-4-hydroxyhydrocinnamate)]methane, bis[(beta-(3,5-ditert-butyl-4-hydroxybenzyl)-methylcarboxyethyl)]sulphone, and thiodiethylene bis(3,5-di-tert-butyl-4-hydroxy)hydrocinnamate; phosphites and phosphonites such as tri(2,4-di-tert-butylphenyl)phosphite and di-tert-butylphenyl-phosphonite; thio compounds such as dilaurylthiodipropionate, dimyristyltlhiodipropionate, and distearylthiodipropionate; various siloxanes; and various amines such as polymerized 2,2,4-trimethyl-1,2-dihydroquinoline and diphenylamines. Antioxidants can be used in amounts of 0.1 to 5 parts by weight per 100 parts by weight of polyethylene.

The PE can be crosslinked by adding a crosslinking agent to the composition or by making the resin hydrolyzable, which is accomplished by adding hydrolyzable groups such as —Si(OR)$_3$ in which R is a hydrocarbyl radical to the PE through grafting or copolymerization. Typically the PE is crosslinked and it is crosslinked through the action of organic peroxide.

The crosslinking of polymers with free radical initiators such as organic peroxides is well known. Generally, the organic peroxide is incorporated into the polymer by melt blending in a roll mill, a biaxial screw kneading extruder, or a BANBURY™ or BRABENDER™ mixer at a temperature lower than the onset temperature for significant decomposition of the peroxide. Peroxides are judged for decomposition based on their half life temperatures as described in Plastic Additives Handbook, Gachter et al, 1985, pages 646 to 649. An alternative method for organic peroxide incorporation into a polymeric compound is to mix liquid peroxide and pellets of the polymer in a blending device, such as a HENSCHEL™ mixer or a soaking device such as a simple drum tumbler, which are maintained at temperatures above the freeze point of the organic peroxide and below the decomposition temperature of the organic peroxide and the melt temperature of the polymer. Following the organic peroxide incorporation, the polymer/organic peroxide blend is then, for example, introduced into an extruder where it is extruded around an electrical conductor at a temperature lower than the decomposition temperature of the organic peroxide to form a cable. The cable is then exposed to higher temperatures at which the organic peroxide decomposes to provide free radicals, which crosslink the polymer.

Suitable crosslinking agents are organic peroxides such as dicumyl peroxide; 2,5-dimethyl-2,5-di(t-butylperoxy)hexane; t-butyl cumyl peroxide; and 2,5-dimethyl-2,5-di(t-butylperoxy)hexane-3. In one embodiment, dicumyl peroxide is a preferred organic peroxide.

Hydrolyzable groups can be added, for example, by grafting an ethylenically unsaturated compound having one or more $Si(OR)_3$ groups such as vinyltrimethoxysilane, vinyltriethoxysilane, and gamma-methacryloxypropyltrimethoxysilane to the polymer in the presence of the aforementioned organic peroxides. The hydrolyzable resins are then crosslinked by moisture in the presence of a silanol condensation catalyst such as dibutyltin dilaurate, dioctyltin maleate, dibutyltin diacetate, stannous acetate, lead naphthenate, and zinc caprylate. In one embodiment, dibutyltin dilaurate is a preferred silanol condensation catalyst.

Examples of hydrolyzable grafted copolymers are vinyltrimethoxy silane grafted ethylene homopolymer, vinyltriethoxy silane grafted ethylene homopolymer, and vinyltributoxy silane grafted ethylene homopolymer. Alternatively, copolymerization of vinyl trialkoxysilane crosslinkers with ethylene and other monomers may be done in a high-pressure reactor that is used in the manufacture of ethylene homopolymers and copolymers with vinyl acetate and acrylates.

Cable Manufacture

Cable using the composition of the invention can be prepared in various types of extruders, e.g., single or twin screw types. Compounding can be effected in the extruder or prior to extrusion in a conventional mixer such as a BRABENDER™ mixer or a BANBURY™ mixer. One description of a conventional extruder can be found in U.S. Pat. No. 4,857,600. One typical extruder has a hopper at its upstream end and a die at its downstream end. The hopper feeds into a barrel which contains a screw. At the downstream end, between the end of the screw and the die, are a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. In wire coating in which the material is crosslinked with an organic peroxide after extrusion, the die of the crosshead feeds directly into a heating zone, and this zone can be maintained at a temperature in the range of 130° C. to 500° C., and preferably in the range of 170° C. to 450° C. Crosslinking processes for cable are described in Electrical Wire Handbook, The Wire Association International, Inc., Guilford, Conn., 1983, pages 112 to 120.

The invention is described more fully through the following examples. Unless otherwise noted, all parts and percentages are by weight.

SPECIFIC EMBODIMENTS

Materials

Chemtura Corporation Lowinox TBM6 (CAS Reg. Number: 96-69-5) [4,4'-Thiobis(6-tert-butyl-m-cresol) or 4,4'-Thiobis (2-t-butyl-5-methylphenol)].

Polyethylene glycol, MW 20,000 (CAS Reg. Number: 25322-68-3).

Pre-Formed Blend

PEG having a molecular weight of 20,000 before processing is melted at a temperature between 100° C. and 120° C. using a stationary heating device with stirring capability. The temperature is kept in this range to avoid the chemical breakdown of PEG 20000 which can occur at elevated temperatures. A ratio of TBM6 to PEG 20000 of 0.6:1 is employed. The appropriate weight of TBM6 is carefully added to the melted PEG 20000 with continuous stirring until total dissolution of the TBM6 occurs. The pre-formed mixture is removed from heat source and allowed to cool at ambient condition (23° C. and atmospheric pressure). The cooled product is a homogeneous solid. Additional samples at different ratios of TBM6 to PEG 20000 are blended in the same manner, but it is necessary to raise the temperature for the high TBM6 content samples to above 120° C. to approximately 170° C.

Figure 1:
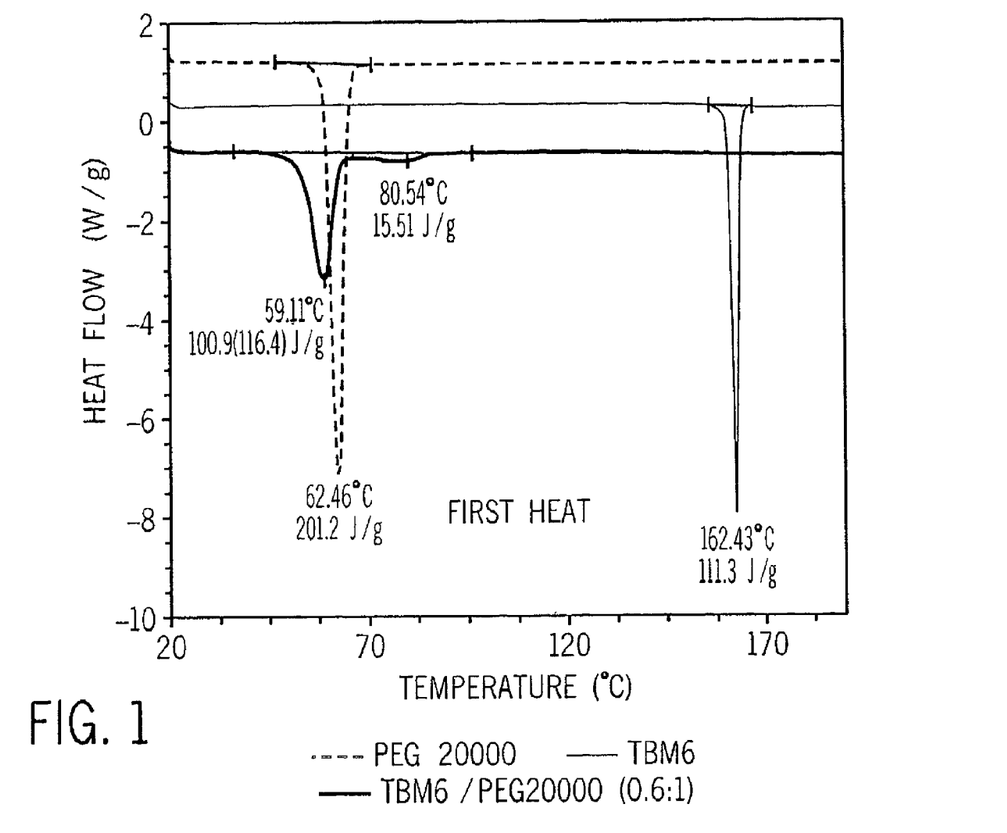
FIG. 1 is a differential scanning calorimetry (DSC) heat scan for a 0.6:1 ratio of TBM6 to PEG 20000 blend.
Figure 2:
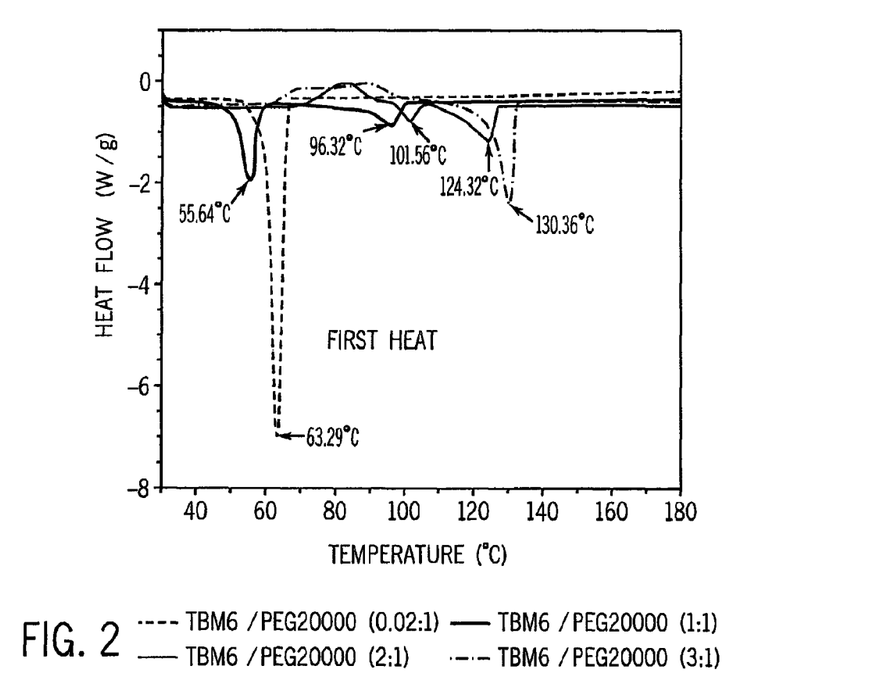
FIG. 2 is a DSC heat scan for TBM6 to PEG 20000 blends at varying weight ratios.

The pre-formed mixtures are tested for melting characteristics using a TA Instruments Thermal Analysis Q-1000 DSC unit. The DSC is equilibrated at 30.0° C., and then ramped at 10.0° C. per minute to 180.0° C. This is the first heat DSC scan. The sample is then held isothermal for 1 minute, ramped at 10.0° C. to −60.0° C., held isothermal for 3 minutes, then ramped at 10.0° C. to 200.0° C. This is the second heat DSC scan. The first heat DSC scan for the 0.6:1 ratio of TBM6 to PEG 20000 is shown in FIG. 1 and the data is listed in Table 1. The melting point of the pre-formed mixture of TBM6 and PEG 20000 at a ratio of 0.6:1 TBM6 to PEG 20000 is significantly lower than TBM6 alone (60-80° C. vs. 162° C.) and lower than PEG 20000 alone (59° C. vs. 62.5° C.). The first heat DSC scans for other pre-formed mixtures of TBM6 and PEG 20000 are shown in FIG. 2.

TABLE 1

DSC Melting Point in ° C. of Pre-Formed Blend of TBM6 and PEG 20000

| TBM6 % | PEG 20000, % | | | | | |
|---|---|---|---|---|---|---|
| | 0 | 25 | 33 | 50 | 61 | 98 | 100 |
| 0 | | | | | | | 62.46 |
| 2 | | | | | | 63.28 | |
| 39 | | | | | 59.11, 80.54 | | |
| 50 | | | | 55.39, 96.33 | | | |
| 67 | | | 101.67 | | | | |
| 75 | | 130.46 | | | | | |
| 100 | 162.43 | | | | | | |

Figure 3:
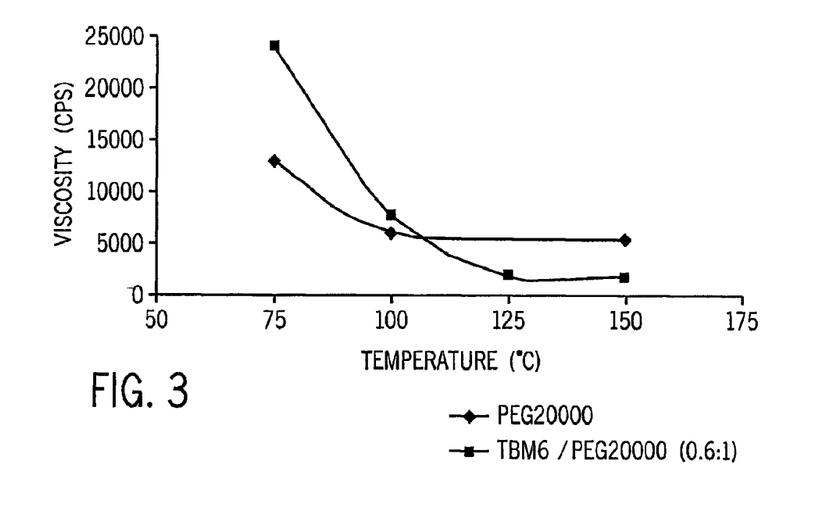
FIG. 3 is a graph reporting the viscosity at various temperatures of a TBM6/PEG 20000 blend at a 0.6:1 ratio.

The pre-formed mixture is heated using a stationary heating device with stirring capability to temperatures of 75° C., 100° C., 125° C. and 150° C. for the purpose of measuring the viscosity using a Brookfield Digital Viscometer Model RVTD equipped with a #6 spindle. The pre-formed mixture of TBM6 and PEG 20000 at a 0.6:1 ratio of TBM6 to PEG 20000 exhibits a significantly lower viscosity above 120° C. than neat PEG 20000, and the data are illustrated in FIG. 3. The complete data are shown in Table 2.

TABLE 2

Viscosity of Pre-Formed Mixtures of TBM6 and PEG 20000

| Temperature, ° C. | 100% PEG | 0.6:1 Ratio of TBM6:PEG 20000 |
| --- | --- | --- |
| 75 | 12,960 | 24,000 |
| 100 | 5,920 | 7,680 |
| 125 | N.M. | 1,904 |
| 150 | 5,280 | 1,808 |

N.M. = Not Measured

PE Composition

LDPE polymer is compounded with the solid pre-formed mixture of TBM6 and PEG 20000 (at a ratio of 0.6:1 TBM6 to PEG 20000) using a Brabender model Prep Mixer/Measuring head laboratory electric batch mixer. The unit is equipped with medium shear rate Cam Blades to provide a combination of milling, mixing and shearing of the sample. The two Brabender temperature zones are set at 120° C. and the rotor speed is set to 25 rpm. The LDPE polymer is added to the Brabender mixer along with the pre-formed mixture of TBM6 and PEG 20000. After the material is loaded, the ram arm closure assembly is lowered and the mixing speed is increased to 40 rpm. The duration of the mixing cycle is 5 minutes. The compound is removed from the Brabender mixer and pressed between Mylar sheets in a compression molding press to cool the compound. This material is defined as the PE compound.

The sample of PE compound in which the TBM6 and PEG 20000 are not added as a pre-formed mixture is included as a comparative example. This comparative example of PE compound is prepared by adding the solid TBM6 additive and the solid PEG 20000 additive (at a ratio of 0.6:1 TBM6 to PEG 20000) to the LDPE polymer using a Brabender model Prep Mixer/Measuring head laboratory electric batch mixer. The unit is equipped with medium shear rate Cam Blades to provide a combination of milling, mixing and shearing of the sample. The two Brabender temperature zones are set at 180° C. and the rotor speed is set to 45 rpm. After the material is loaded, the ram arm closure assembly is lowered and the material is mixed for 3 minutes. The compound is removed from the Brabender mixer and pressed between Mylar sheets in a compression molding press to cool the compound. This material is defined as the PE compound comparative example in which the TBM6 and PEG 20000 are not added as a pre-formed mixture.

One portion of the PE compound containing the pre-formed mixture of TBM6 and PEG 20000 is tested for DSC Oxidation Induction Time (OIT) according to ASTM D 3895-07 using a TA Instruments Thermal Analysis Q-1000 DSC unit. The samples are pressed into nominal 10 mil thick films at a temperature of 130° C., and approximately 5 mg of film is tested. One sample of PE compound in which the TBM6 and PEG 20000 are not added as a pre-formed mixture is tested for DSC OIT as well. The PE compound containing the pre-blended melt mixture of TBM6 and PEG 20000 at a 0.6:1 ratio of TBM6 to PEG 20000 exhibits significantly higher DSC OIT averages than the PE compound containing TBM6 and PEG 20000 that is not pre-blended, and the data are shown in Table 3.

TABLE 3

DSC OIT Results

| | Comparative Sample | Inventive Sample Pre-blended Mixture of TBM6 and PEG 20000 |
| --- | --- | --- |
| TBM6, % | 0.37 | 0.37 |
| PEG 20000, % | 0.60 | 0.60 |
| DSC OIT, 200° C., minutes | 114.8 | 159.4 |

TR-XLPE Composition

LDPE polymer is compounded with the solid pre-formed mixture of TBM6 and PEG 20000 (at a ratio of 0, 6:1 TBM6 to PEG 20000) using a Brabender model Prep Mixer/Measuring head laboratory electric batch mixer. The unit is equipped with medium shear rate Cam Blades to provide a combination of milling, mixing and shearing of the sample. The two Brabender temperature zones are set at 120° C. and the rotor speed is set to 25 rpm. The LDPE polymer is added to the Brabender mixer along with the pre-blended mixture of TBM6 and PEG 20000. After the material is loaded, the ram arm closure assembly is lowered and the mixing speed is increased to 40 rpm. The duration of the mixing cycle is 5 minutes. Melted dicumyl peroxide is then added over a 5 minute time period to the formulation via syringe, followed by fluxing for 2 minutes at 40 rpm to achieve desired dispersion. The batch is removed from the mixer bowl and compressed in a hydraulic press between the Mylar sheets to desired form and allowed to cool. This material is defined as the TR-XLPE Compound.

One sample of TR-XLPE compound in which the TBM6 and PEG 20000 are not added as a pre-formed mixture is included as a comparative example. This comparative example of TR-XLPE compound is prepared by adding the solid TBM6 additive and the solid PEG 20000 additive (at a ratio of 0.6:1 TBM6 to PEG 20000) to the LDPE polymer using a Brabender model Prep Mixer/Measuring head laboratory electric batch mixer. The unit is equipped with medium shear rate Cam Blades to provide a combination of milling, mixing and shearing of the sample. The two Brabender temperature zones are set at 180° C. and the rotor speed is set to 45 rpm. After the material is loaded, the ram arm closure assembly is lowered and the material is mixed for 3 minutes. The compound is removed from the Brabender mixer and pressed between Mylar sheets in a compression molding press to cool the compound. This PE compound is then transferred to a two roll mill for addition of the peroxide. The two roll mill rollers are set at 120° C. and the melted peroxide is added slowly via a syringe. Once the peroxide is incorporated, the material is mixed for 5 minutes. The compound is removed from the two roll mill and cut into strips. This material is defined as the TR-XLPE comparative example in which the TBM6 and PEG 20000 are not added as a pre-formed mixture.

The TR-XLPE compound is converted to crosslinked plaques for mechanical and electrical testing. Nominal seventy-five mil thick plaques for tensile testing are pressed on a GREENARD™ quench cool manual press using a single press technique. Mylar sheets are placed between the samples and the press to ensure cleanliness of the plaques. The material is pressed at 500 psi and 120° C. for three minutes followed by fifteen minutes at 2600 psi and 190° C. The plaques are cooled in the press for five minutes.

Tensile strength and tensile elongation testing are conducted on an INSTRU-MET™ Model 4201 tensile testing machine according to ASTM D638. Samples are tested with the 100 pound load cell at a speed of 20 inches per minute. Tensile strength and tensile elongation properties are measured on plaques without heat aging and after heat aging at 136° C. and at 150° C. for up to 3 weeks. Heat aging is conducted by suspending the tensile bars in a Blue M Electric Company convention oven for the specified time period. The criteria for acceptable heat aged tensile strength and tensile elongation tests are to retain greater than 75 percent of the initial property after this aging protocol.

The TR-XLPE compound containing the pre-blended mixture of TBM6 and PEG 20000 at a 0.6:1 ratio of TBM6 to PEG 20000 met the criteria for heat aged tensile strength and tensile elongation tests, that is to retain greater than 75 percent of the initial property value. The data are shown in Table 4.

Water tree grown rate is measured according to ASTM D6097. The test specimens are compression molded disks with a molded-in conical shaped defect of tip radius 3 micron. The samples are aged in an aqueous conductive solution of 0.01 molar NaCl with an applied voltage of 5 kV at 1 kHz and room temperature for 30 days. The concentrated electrical stress at the molded-in defect initiates the formation and growth of a vented water tree. Following aging, the specimens are stained and sliced so that the water trees could be observed by microscopy and the water tree length measured.

The TR-XLPE compound containing the pre-blended mixture of TBM6 and PEG 20000 at a 0.6:1 ratio of TBM6 to PEG 20000 exhibits a resistance to water tree growth which is essentially equivalent to the result for the comparative example. The data are shown in Table 4.

TABLE 4

Tensile Strength and Tensile Elongation Results for TR-XLPE Compositions

|  | Inventive Sample | Comparative Sample |
| --- | --- | --- |
| Additives Concentration, % | | |
| TBM-6 | 0.4 | 0.4 |
| Dicumyl Peroxide | 1.8 | 1.8 |
| PEG 20000 | 0.6 | 0.6 |
| Water Tree Information | | |
| Water Tree Length, mm | 0.076 | 0.071 |
| Point to Plane Specimen Thickness, mm | 3.525 | 3.317 |
| Resistance to Water Tree Growth | 46.4 | 46.7 |
| Tensile Strength, psi | | |
| Initial | 2842 | 2862 |
| Heat Aged at 136° C. | | |
| 1 week | 2955 | 2441 |
| % Retained | 104 | 85 |
| 2 week | 3038 | 2545 |
| % Retained | 107 | 89 |
| Heat Aged at 150° C. | | |
| 1 week | 2771 | 2074 |
| % Retained | 98 | 72 |
| 2 weeks | 2832 | 2396 |
| % Retained | 100 | 84 |
| Elongation, % | | |
| Initial | 555 | 558 |
| Heat Aged at 136° C. | | |
| 1 week | 578 | 541 |
| % Retained | 104 | 97 |
| 2 weeks | 574 | 555 |
| % Retained | 103 | 99 |

TABLE 4-continued

Tensile Strength and Tensile Elongation Results for TR-XLPE Compositions

|  | Inventive Sample | Comparative Sample |
| --- | --- | --- |
| Heat Aged at 150° C. | | |
| 1 week | 558 | 519 |
| % Retained | 101 | 93 |
| 2 weeks | 557 | 523 |
| % Retained | 100 | 101 |

ADDITIONAL EXAMPLES

In the following examples, PEG 20000 and TBM6 are used as received. DXM-446, which is a low density polyethylene (density of 0.92 g/cc, melt index of 2.3 g/10 min, made via high pressure polymerization of ethylene) are cryogenically ground to a fine particle size range of 1 to 2,000 micrograms before using. Materials are then either analyzed via differential scanning calorimetry (DSC) as pure materials (Comparative Examples 1-3) or are intimately blended using a mortar and pestle at room temperature to create physical blends (Examples 1 and 2).

DSC is conducted using aluminum pans under nitrogen atmosphere with a heat rate of 10° C./minute starting at 10° C. and ending at 200° C.

The results are reported in Table 5. Comparative Examples 1-3 show that when measured alone PEG 20,000 melts at 65° C., TBM6 melts at 163° C., and DXM-446 melts at 111° C. Surprisingly, as shown in Example 1, the 62:38 blend of PEG 20,000:TBM6 shows only one major endotherm, which is at 63° C. (insignificant endotherms amounting to only about 1% of the total are visible at 110 and 162° C.). Similarly, in Example 2, the TBM6 melting endotherm, which occurred at 163° C. in pure TBM6, is negligible (enthalpy of the peak 162° C. is a negligible 0.8% of the total enthalpy), with the only significant peaks being present at 64° C. and 110° C. In Example 3, only one major endotherm is present, which is at 60.6° C. Example 4 shows a main endotherm at 61.6° C., with only small endotherms at higher temperatures, which represents a >76% reduction in the enthalpy of the high temperature (>100° C.) peaks compared to what would be predicted based on the individual components. Similarly, Example 5 shows a main endotherm at 64.2° C., with only small endotherms at higher temperatures, which represents a >77% reduction in the enthalpy of the high temperature (>100° C.) peaks compared to what would be predicted based on the individual components. Not being bound by theory, it is believed that the phenomena causing the endothermic peaks at 63-64° C. in Examples 1 and 2 are melting of PEG 20,000 with surprising concomitant dissolving of TBM6 in the PEG 20,000 melt (with the peak at 110° C. in Example 2 being due primarily to melting of the DXM-446). The results show that the physical blend of the current invention surprisingly eliminates nearly all of the high temperature melting of TBM6.

TABLE 5

Melting Point Profiles of Blend Components and Blends

| | Composition (% by Weight) | | | |
|---|---|---|---|---|
| | TBM6 | PEG 20,000 | DXM-446 | DSC Peak Temp ° C./ Enthalpy of Peak J/g |
| C. E. 1 | 100 | 0 | 0 | 162.6/−109.4 |
| C. E. 2 | 0 | 100 | 0 | 64.8/−185.8 |
| C. E. 3 | 0 | 0 | 100 | 110.8/−95.3 |
| Ex 1 | 38 | 62 | 0 | 62.9/−107.5 |
| | | | | 130.4/−0.5 |
| | | | | 159.4/−0.7 |
| Ex. 2 | 11 | 19 | 70 | 64.2/−38.1 |
| | | | | 109.5/−78.8 |
| | | | | 161.9/−0.9 |
| Ex. 3 | 10 | 90 | 0 | 60.6/170.9 |
| Ex. 4 | 90 | 10 | 0 | 61.6/47.9 |
| | | | | 106.3/2.0 |
| | | | | 128.8/2.8 |
| | | | | 141.8/2.2 |
| | | | | 158.9/16.8 |
| Ex. 5 | 62 | 38 | 0 | 60.9/73.5 |
| | | | | 102.4/10.9 |
| | | | | 128.4/4.2 |
| | | | | 161.5/0.4 |

Although the invention has been described with certain detail through the preceding description of the preferred embodiments, this detail is for the primary purpose of illustration. Many variations and modifications can be made by one skilled in the art without departing from the spirit and scope of the invention as described in the following claims.

What is claimed is:

1. A process of preparing a mixture consisting essentially of:
   A. at least one thiobis phenolic antioxidant, selected from the group consisting of 2,2'-thiobis(6-t-butyl-4-methylphenol); 4,4'-thiobis(2-methyl-6-t-butylphenol); 2,2'-thiobis 4-octylphenol; and 4,4'-thiobis-(2-t-butyl-5-methyl-phenol) (TBM6),
   B. at least one polyalkylene glycol (PAG) of a weight average molecular weight of at least 10,000,
   in which the thiobis phenolic antioxidant and PAG are present at a thiobis phenolic antioxidant to PAG weight ratio from 0.1:1 to 2:1,
   the process comprising the steps of dissolving the PAG and thiobis phenolic antioxidant in a halogenated hydrocarbon, and then removing the halogenated hydrocarbon by evaporation.

2. The mixture of claim 1, in which the PAG is polyethylene glycol.

3. A process of preparing the mixture of claim 1, the process comprising the step of melt blending the PAG with the thiobis phenolic antioxidant.

4. A process of preparing the mixture of claim 1, the process comprising the step of dry blending the PAG and the thiobis phenolic antioxidant.

5. The process of claim 4, comprising the further step of compacting the dry blend into a compacted article.

6. A crosslinkable polyethylene composition comprising a polyethylene, the mixture of claim 1, and an organic peroxide.

7. The crosslinkable PE composition of claim 6, in which the mixture of claim 1 comprises from 0.1 to 3 weight percent of the composition.

8. The crosslinkable PE composition of claim 6, in which the organic peroxide is present in an amount of 0.3 to 3 parts by weight of PE.

9. The crosslinkable PE composition of claim 6, in which the PE is at least one of LDPE, LLDPE, ULDPE, VLDPE and HDPE.

10. The crosslinkable PE composition of claim 6, in which the PE is a low density homopolymer of ethylene prepared by a high pressure process.

11. A method of mixing a solid thiobis phenolic antioxidant with polyethylene, the method comprising the steps of (A) dissolving thiobis phenolic antioxidant and polyalkylene glycol (PAG) in a common solvent to form a blend, (B) removing the solvent from the blend, and (C) mixing the blend with polyethylene.

12. The method of claim 11, in which the thiobis phenolic antioxidant and PAG are melt-mixed to form the blend prior to mixing the blend with polyethylene.

13. The method of claim 11, in which the thiobis phenolic antioxidant and PAG are dry blended to form the blend prior to mixing the blend with the polyethylene.

14. The method of claim 13, in which the blend is homogeneous.

15. A cable comprising an electrical conductor surrounded by a composition comprising:
   A. A crosslinked, low density homopolymer of ethylene prepared by a high pressure process; and
   B. The additive mixture of claim 1.

* * * * *